No. 845,713. PATENTED FEB. 26, 1907.
W. P. A. MACFARLANE.
FLUID PRESSURE BRAKE.
APPLICATION FILED AUG. 22, 1904.
3 SHEETS—SHEET 1.
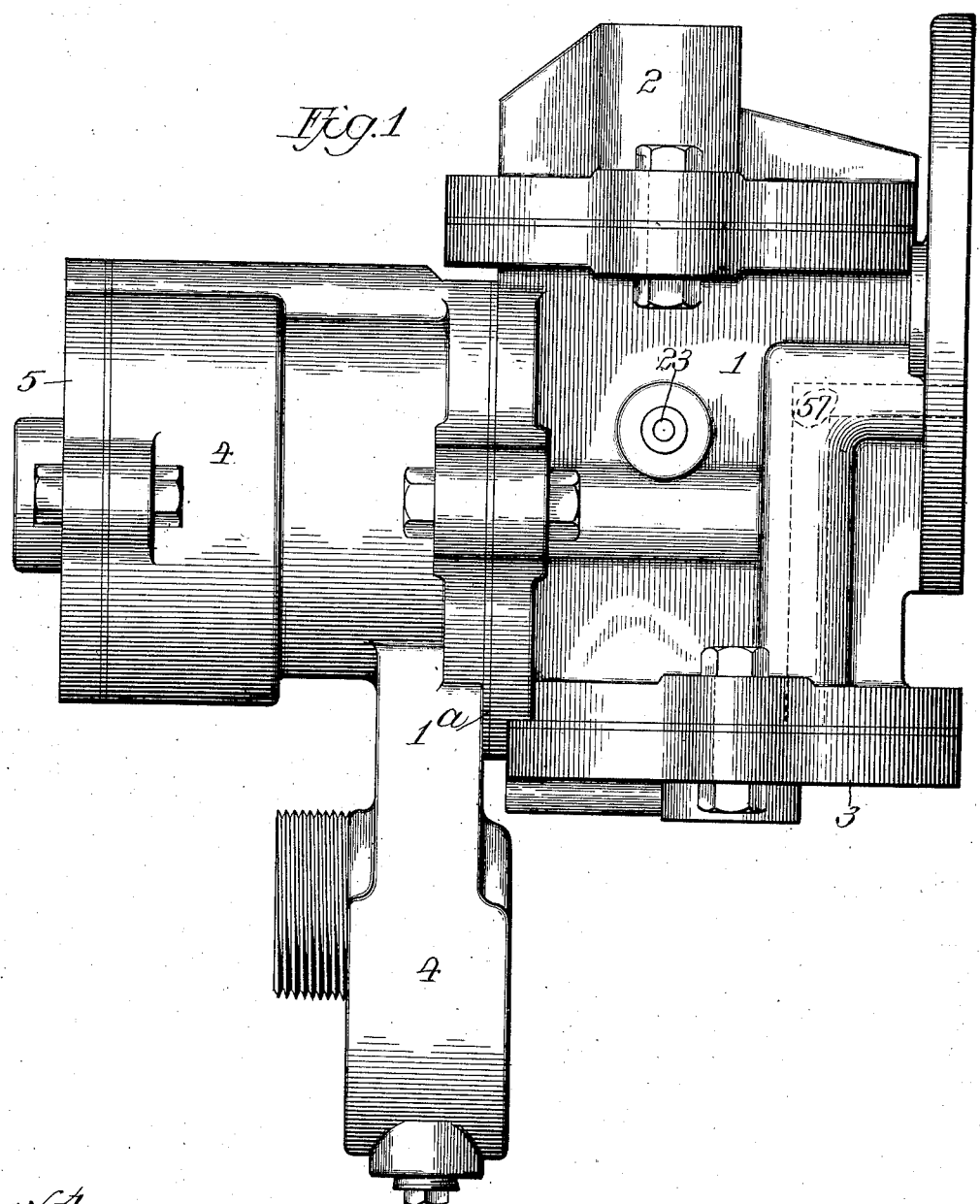

No. 845,713. PATENTED FEB. 26, 1907.
W. P. A. MACFARLANE.
FLUID PRESSURE BRAKE.
APPLICATION FILED AUG. 22, 1904.
3 SHEETS—SHEET 2.
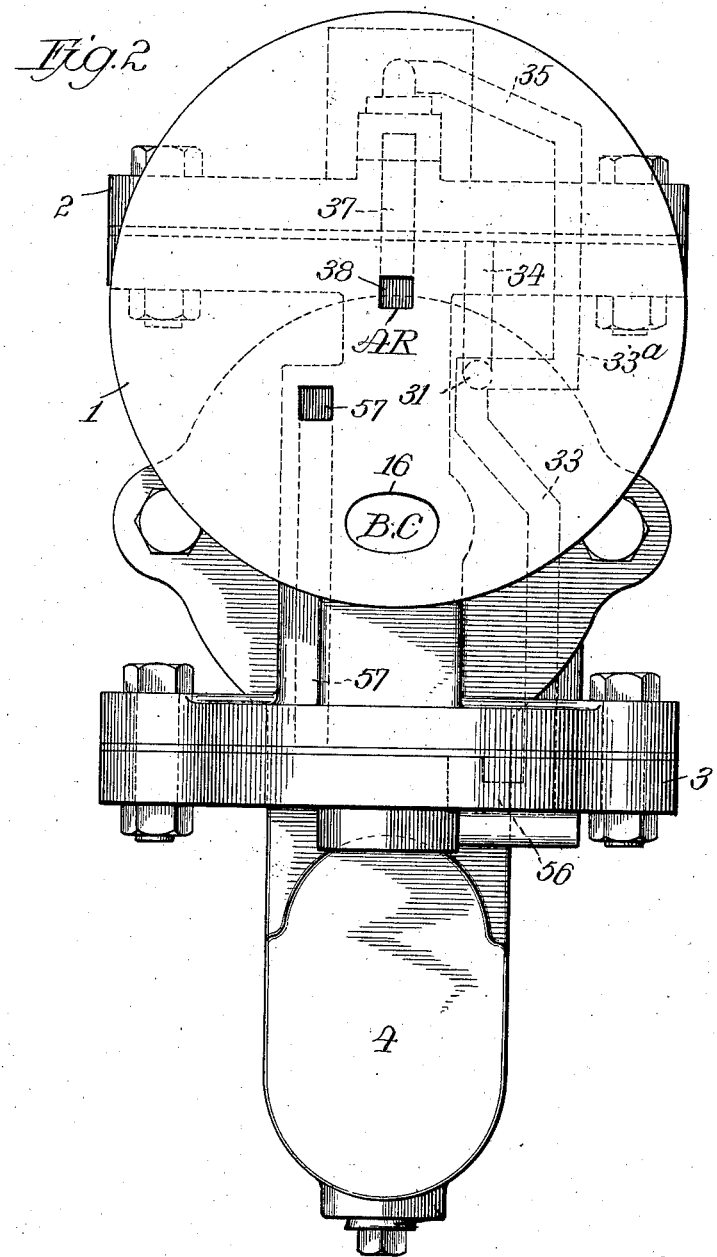

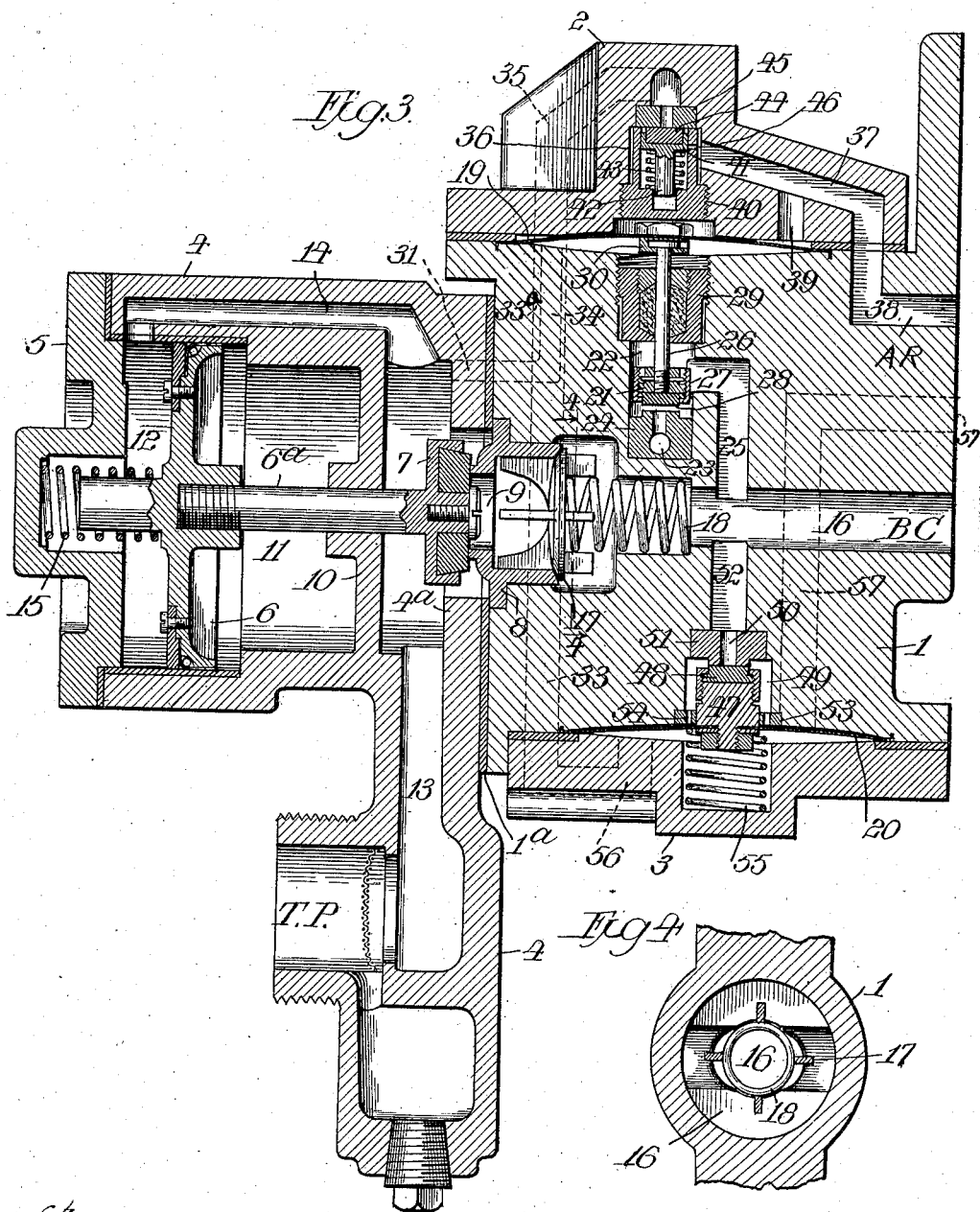

UNITED STATES PATENT OFFICE.

WILLIAM P. A. MACFARLANE, OF CHICAGO, ILLINOIS.

FLUID-PRESSURE BRAKE.

No. 845,713. Specification of Letters Patent. Patented Feb. 26, 1907.

Application filed August 22, 1904. Serial No. 221,760.

*To all whom it may concern:*

Be it known that I, WILLIAM P. A. MACFARLANE, a citizen of the United States, residing at Chicago, in the county of Cook and State of Illinois, have invented certain new and useful Improvements in Fluid-Pressure Brakes, of which the following is a specification.

My invention relates to fluid-pressure brake systems in general and to the so-called "triple-valve" device thereof in particular for the purpose of actuating the brakes of railway-cars; and the object thereof is to produce a simple, efficient, and reliable device of this character whose features of advantage and utility will be understood from the description hereinafter given.

In the drawings, Figure 1 is a side elevation of my valve device; Fig. 2, an end elevation thereof, showing some of the air-passages in dotted lines; Fig. 3, a central section of the valve device, and Fig. 4 a section on the line 4 4 of Fig. 3.

Referring to the construction herein illustrated, the valve device comprises several main parts united together and having suitable connections with the train-pipe, auxiliary reservoir, and brake-cylinder. As shown, such device comprises a main casing or valve-body 1, a top cap 2, a bottom cap 3, supplemental casing 4, and end cap 5 therefor, such parts being properly secured together by bolting or otherwise. The valve-body contains the auxiliary-reservoir connection (marked A R) and the brake-cylinder connection, (marked B C,) while the supplemental casing contains the train-pipe connection, (marked T P.)

First describing the supplemental casing 4, such casing is formed with an interior chamber in which is arranged to travel an emergency-valve piston 6. This piston has a stem 6ª extending laterally toward the valve-body and is provided at its extreme end with an emergency-valve 7 of the puppet type, adapted to seat upon a seat 8 and to control an emergency-port 9 therethrough, as hereinafter explained. This piston stem or rod passes through a wall or partition 10 in the supplemental casing, so as to be guided thereby; but the fitting of the stem is not so accurate or tight as to prevent the leakage of air-pressure from the train-pipe into the interior chamber to the right-hand side of the piston, Fig. 3, for a purpose to be described.

The interior chamber, in which the emergency-valve piston operates, is closed by the end cap 5, and for the sake of definite description that part of such chamber on the right-hand side of that piston will be designated as 11 and that part on the left-hand side will be designated as 12. Tracing the ports and passages from the train-pipe to the emergency-valve apparatus, the train-pipe passage (marked T P) communicates with a vertical passage 13, leading upwardly past the emergency-valve and thence by a lateral passage 14 in the supplemental casing to the chamber 12, with the result that the train-pipe pressure on the left of the emergency-piston holds the emergency-valve to its seat, while such piston is exposed on its other side to pressure equal to train-pipe pressure which has leaked into the chamber 11 through the leakage arrangement provided in the partition 10, as described. The chamber 11 may therefore be styled an "emergency-pressure" chamber in view of the fact that the pressure is practically confined there and that the function of that pressure is to operate the emergency-valve, as hereinafter described, when the train-pipe pressure has been reduced for emergency action. By preference, though not of necessity, a spring 15 is employed to press against the emergency-valve piston to assure the return of the emergency-valve to its seat, although the air-pressure has been found sufficient for such purpose.

As indicated in the drawings, the supplemental casing serves as a partial cap for the main casing or valve-body inasmuch as the end 4ª thereof constitutes a plate or disk abutting such body and in the construction shown acting to hold the emergency-valve seat in place. This plate or disk 4ª of course has an opening in which the emergency-valve and its seat coöperate. It will be understood that the casing 4 is secured to the valve-body in suitable manner, as by bolting, and that a gasket 1ª is by preference interposed between them.

The emergency-port 9 in the valve-seat communicates with a straightway passage 16, of considerable size and extending transversely of the valve-body to the brake-cylinder, wherefore such passage will be hereinafter termed the "brake-cylinder" passage. A check-valve 17 is arranged in this passage to prevent return of the brake-cylinder pressure to the train-pipe after emergency action, such check-valve in the present instance seating against the same seat as the emergency-valve, but at the opposite end thereof. A spring 18 is preferably used as a matter of abundant precaution to normally hold the check-valve seated; but as a matter of fact such spring may be entirely dispensed with.

Before describing further details I will state that the upper and lower faces of the valve-body are slightly hollowed and also provided with a circular groove to receive the flanged margins of the diaphragms 19 and 20, constituting the movable abutments for operating, respectively, the release-valve and the service-valve, it being understood that the diaphragms are clamped between the valve-body and their respective caps 2 and 3. From the description thus far given it will be observed that the emergency-valve mechanism, the brake-release-valve mechanism, and the service-valve mechanism are both physically and operatively independent, but nevertheless coöperate to the same result—that is, the operation of the brakes of a fluid-pressure brake-cylinder.

Referring first to the brake-release mechanism, the brake-release valve 21 depends from and is operatively connected with the diaphragm 19. This valve works in a chamber 22 in the valve-body and governs the brake-release port 23, formed in a valve-seat 24 in the bottom of the chamber and leading through the side of the valve-body to the atmosphere. This chamber 22 connects with the brake-cylinder passage 16 by means of the passage 25, with the result that when the parts are in normal or running position, as shown in the drawings, the brake-cylinder is at exhaust through passages 16 and 25, chamber 22, and release-port 23 to the atmosphere. In the particular construction shown the brake-release valve comprises a head pinned to the lower end of the valve-stem 26 and externally screw-threaded to receive a sleeve or cap 27, which holds the rubber valve 28 in place. The valve may thus be renewed by simply substituting a new rubber disk or seat. The valve-stem works through a stuffing-box 29, and its upper end, which is in the form of a flange or head, is arranged to be hooked into a socket-piece 30, secured to the under side of the diaphragm 19 and provided with a side recess to receive such head of the valve-stem, as illustrated in the drawings. Now describing the air-ports and passages coöperating with the brake-release mechanism, the train-pipe passage 13 communicates, near its upper end, with a branch feed-passage 31, which communicates with a substantially vertical but somewhat crooked passage 33 and with an upward continuation thereof 33ª, as illustrated in Fig. 2. Passage 31 also communicates with a passage 34, leading upwardly and terminating on the upper face of the valve-body at a point below the diaphragm 19, so that such diaphragm is at all times exposed to train-pipe pressure. The passage 33ª communicates at its upper end with a passage 35, extending in the cap 2 to a chamber 36 therein, from which a feeding-passage 37 leads to the auxiliary-reservoir passage 38 in the valve-body. A short passage 39 leads from passage 37 to the upper face of the diaphragm 19, so that such diaphragm is constantly exposed to auxiliary-reservoir pressure, and thereby caused to move by the differences in pressure on its opposite sides, due to the reductions of train-pipe pressure and the restoration of such pressure in the practical operation of the brakes.

The purpose of the provision of chamber 36 is to accommodate a check-valve device which may be employed, if desired. Of course if such valve device is not employed the passage 35 would lead direct to the feed-passage 37. This check-valve device comprises a cylindrical bushing 40, inserted in the chamber and receiving a piston-head 41, arranged to travel therein. This head has a stem 42, guided in an opening in the bushing, and is normally held upwardly with a yielding pressure by a coiled spring 43. The piston-head is, in fact, a valve, inasmuch as it is provided with a rubber valve 44, adapted to normally close the port and passage 35, which terminates in the valve-seat 45. The bushing has a small feed-port 46 through one side wall, which port communicates at all times with the passage 37, but is normally cut off from communication with the train-pipe-pressure supply through the passage 35. This cutting off of communication is due to the normal position of the piston-head; but, as will be understood, the spring 43 has very little tension, so that in feeding the auxiliary reservoir the train-pipe air is enabled to force the piston-head downwardly and thereupon uncover the small feed-port 46 and establish direct communication between the train-pipe and the auxiliary reservoir. When the pressures in the reservoir and train-pipe are substantially equalized, the check-valve closes, and so also in the operation of the brakes this check-valve prevents the return of pressure to the train-pipe. It will be understood that the piston-head 41 does not fit so tight in the bushing 40 as to prevent air-pressure from leaking or passing around to the space therebelow. On the contrary, the fit is such that the reservoir-air may leak into such space and likewise therefrom when the piston-head is depressed, so that the latter may operate properly.

Now referring to the service-valve mechanism, the diaphragm 20 is provided with a service-valve extending upwardly and inwardly in the valve-body, which valve consists of a stem 47 and a rubber valve proper, (marked 48.) The service-valve works in a chamber 49 and is adapted to control the port 50 in a valve-seat 51, which port communicates with the brake-cylinder passage 16 through the passage 52. In the present instance the service-valve is guided in a ring 53, which is inserted in the chamber 49 and which has a series of ports 54 to enable the air-pressure to pass from the upper side of the diaphragm 20 to the chamber 49 and thence to the brake-cylinder when the service-valve is opened. The service-valve is also provided with a spring 55 as a matter of abundant precaution; but the same is not essential to the practical working of the valve.

Next describing the air-passages concerned with the service-valve mechanism, the passage 33 connects at its lower end with the passage 56, formed in the lower cap 3 and terminating at a point below the diaphragm 20, so that such diaphragm is constantly exposed on its lower side to train-pipe pressure. The space above the diaphragm communicates at all times with the passage 57 in the valve-body, so that the upper side or face of the service-valve diaphragm is exposed to auxiliary-reservoir pressure.

As hereinbefore stated, the port 46 in the bushing of the check-valve is a small one, and the same is, in fact, considerably smaller in carrying capacity than the passages 35, 37, and 38, forming the direct feed-passage from the train-pipe to the auxiliary reservoir. In other words, this small port 46 forms a restriction in the feed or carrying capacity of the feed-passage to the auxiliary reservoir. Moreover, this small port is of less carrying capacity than the passage 34, which leads from the train-pipe to the under side of the brake-release diaphragm 19, with the result that in the operation of releasing the brakes such restriction compels an accumulation of the train-pipe pressure on the under side of the diaphragm 19 before any considerable amount of pressure is permitted to be fed into the auxiliary reservoir. Consequently the brakes are caused to be released rather than permitted to remain set and the reservoir to be fed with air-pressure. It will be understood that this result can be accomplished by simply providing a means of restriction in the feed-passage from the train-pipe to the auxiliary reservoir or interfering in some manner with the carrying capacity thereof—as, for instance, by providing the small port 46, as described, which in practice is about one thirty-second of an inch in diameter; but in addition to the employment of such small port it is preferred to use the check-valve operating in said bushing, with the result that such small port is assisted in causing the stated accumulation of pressure underneath the brake-release diaphragm. This is due to the fact that the check-valve of itself affords some retarding of the feed from the train-pipe to the reservoir as compared with the free unobstructed flow of pressure from the train-pipe to the under side of the brake-release diaphragm.

Assuming that the parts are in running position, as illustrated in the drawings, and assuming also that the auxiliary reservoir is charged with pressure, upon a reduction of train-pipe pressure sufficient for service action the preponderance of pressure on the upper side of the brake-release diaphragm forces the brake-release valve downwardly so as to close the brake-release port, so that the brake-cylinder is no longer at exhaust. At the same time the preponderance of auxiliary-reservoir air on the upper side of the service-valve diaphragm forces such diaphragm downwardly and withdraws the service-valve from its seat, with the result that the auxiliary-reservoir pressure is admitted to the brake-cylinder, the air passing from the reservoir through the passage 57, small ports 54, chamber 49, port 50, passage 52, and brake-cylinder passage 16 to the brake-cylinder. Upon such reduction of train-pipe pressure the pressure in the emergency-piston chamber 11 will leak slowly through the partition 10 into the train-pipe, and as the reduction is not sudden or of any considerable amount the pressure in such chamber will have no effect upon the emergency-valve piston. Upon a restoration of train-pipe pressure to release the brakes the diaphragms are both forced to normal or running position, with the result that the service-valve is closed and the brake-release valve is opened. Upon the opening of such release-valve the brake-cylinder pressure escapes through the brake-cylinder passage 16, passage 25, chamber 22, and release-port 23 to the atmosphere. The operation of feeding the auxiliary reservoir has already been described, and so it will suffice to say that the train-pipe pressure passes through the passage 19 and passage 35 and, forcing the check-valve downwardly, opens the small port 46 and then passes through the passages 37 and 38 to the auxiliary reservoir. In emergency action, upon the sudden and considerable reduction required for such action, the pressure in the chamber 12 behind the emergency-valve piston is suddenly reduced and reduced much faster than the pressure from the chamber 11 can leak back into the train-pipe, with the result that the air-pressure practically confined in the chamber 11 will quickly and forcibly move the piston outwardly and pull the emergency-valve off its seat. The train-pipe air will thereupon be vented directly from the train-pipe past the emergency check-valve and through the straightway passage 16 to the brake-cylinder, the brake-release mechanism having already operated to close the release to the atmosphere. The service-valve is also opened, with the result that the auxiliary-reservoir pressure is also admitted to the brake-cylinder in the manner hereinbefore described.

The emergency-valve is operated, as described, by a confined body of air, which is used solely for the purpose of actuating that valve, and such action is therefore independent of the auxiliary-reservoir pressure. Consequently emergency action can be obtained at any time and under all conditions, which is not possible where reliance is had upon the auxiliary-reservoir pressure for the operation of the emergency-valve mechanism. For instance, with my form of valve emergency action can be obtained initially also after service action, and, in fact, such emergency can be obtained even when the well-known pressure-retainers are set and in operation.

I claim—

1. In a device for actuating railway-brakes of the type in which the brake-release and service-valve mechanisms are independent, the combination, with such mechanisms, of emergency-valve mechanism operated by a preponderance of pressure independent of the train-pipe pressure and auxiliary-reservoir pressure.

2. In a valve device for actuating railway-brakes of the type in which the brake-release and service-valve mechanisms are independent, the combination, with such mechanisms, of emergency-valve mechanism independent thereof and comprising an emergency-valve and a movable abutment operatively connected with said emergency-valve and operating in a chamber supplied with air from the train-pipe but independent of all the operations of the valve device except emergency action.

3. In a valve device for actuating railway-brakes of the type in which the brake-release and service-valve mechanisms are independent, the combination, with such mechanisms, of emergency-valve mechanism independently thereof and comprising an emergency-valve and a movable abutment operatively connected with said emergency-valve and operating in a chamber having communication at opposite sides of the abutment with the train-pipe, the communication on one side of the abutment being restricted as compared with that on the other.

4. In a valve device for actuating railway-brakes of the type in which the brake-release and service-valve mechanisms are independent, the combination, with such mechanisms, of emergency-valve mechanism independent thereof and comprising an emergency-valve arranged in a passage for the feed of air from the train-pipe to the auxiliary reservoir, and a movable abutment operatively connected with the emergency-valve and operated in the opening movement of the emergency-valve by air-pressure independently of train-pipe and auxiliary-reservoir pressure.

5. In a valve device for actuating railway-brakes of the type in which the brake-release and service-valve mechanisms are independent, the combination, with such mechanisms, of emergency-valve mechanism independent thereof and comprising an emergency-valve arranged in a passage for the feed of air from the train-pipe to the auxiliary reservoir and adapted to seat against and normally close a vent leading direct from said passage to the brake-cylinder, and a movable abutment operatively connected with the emergency-valve and actuated only in emergency applications of the brake.

6. In a device for actuating railway-brakes, the combination of an emergency-valve governing a passage from the train-pipe to the brake-cylinder, a piston having a stem operatively connected with the valve, a chamber in which such piston travels and through a wall of which the stem extends, the chamber receiving a supply of air from the train-pipe by a restricted feed through said wall, said supply of air being practically confined and adapted to actuate the piston in emergency action.

7. In a device for actuating railway-brakes, the combination of an emergency-valve governing a passage from the train-pipe to the brake-cylinder, a piston operatively connected with the valve, and exposed on opposite sides to train-pipe pressure, a casing having a chamber in which the piston travels and which on one side of the piston has free communication with the train-pipe and on the other side a restricted communication, said passage from the train-pipe to the brake-cylinder being independent of said chamber.

8. In a device for actuating railway-brakes, the combination of an emergency-valve governing a passage from the train-pipe to the brake-cylinder, a piston operatively connected with the valve, a casing arranged to communicate with the train-pipe and having a partition forming a chamber in which the piston travels, a piston-stem connecting the piston and valve and passing through said partition, and means for providing a restricted feed of train-pipe air through the partition to one side of the piston and a free feed to the other side thereof.

9. The combination of a valve-body having a transverse passage arranged to communicate between the train-pipe and the brake-cylinder and extending from side to side of the valve-body, brake-release and service-valve mechanisms arranged in said valve-body to respectively control the release and admission of pressure through said passage, and an emergency-valve arranged at one side of the valve-body and at one end of said passage to govern the venting of train-pipe air to the brake-cylinder in emergency action.

10. The combination of a valve-body having a transverse brake-cylinder passage arranged to communicate between the train-pipe and brake-cylinder and extending from side to side of the valve-body, and also having a release-passage leading from such brake-cylinder passage to the atmosphere, and a service-passage leading from the auxiliary reservoir to such brake-cylinder passage, means for governing said release and service passages, and means for governing the venting of train-pipe air to the brake-cylinder.

11. In a device for actuating railway-brakes, brake-release mechanism comprising a diapraghm exposed on its opposite sides to train-pipe and auxiliary-reservoir pressure, a release-valve governing a port from the brake-cylinder to the atmosphere, and operatively connected with the diaphragm, said release-valve consisting of a valve-body, a flexible seat, and a cap or sleeve for holding the seat to the valve-body.

12. In a device for actuating railway-brakes, brake-release mechanism comprising a diaphragm exposed on its opposite sides to train-pipe and auxiliary-reservoir pressure, a release-valve governing a port from the brake-cylinder to the atmosphere, and operatively connected with the diaphragm, said release-valve consisting of a valve-body externally screw-threaded, a flexible seat, and a cap or sleeve screwing onto the valve-body and arranged to hold the seat to such valve-body.

13. The combination of a valve-body or main casing having a direct passage extending therethrough from side to side from the train-pipe to the brake-cylinder, a valve-seat at one end of said passage, and an emergency-valve adapted to seat thereon to control the venting of train-pipe air to the brake-cylinder, and a check-valve arranged in said passage and also seating on said valve-seat.

14. The combination of a valve-body or main casing having a direct passage from the train-pipe to the brake-cylinder and extending from side to side of the valve-body, brake-release mechanism, service mechanism and emergency mechanism communicating with said passage.

15. The combination of a valve-body or main casing having a direct passage from the train-pipe to the brake-cylinder, and extending from side to side of the valve-body, an emergency-valve controlling the venting of train-pipe air to the brake-cylinder through said passage, and brake-release mechanism and service mechanism communicating with said passage.

16. The combination of a valve-body or main casing having a direct passage from the train-pipe to the brake-cylinder, and extending from side to side of the valve-body, an emergency-valve governing one end of said passage and controlling the venting of train-pipe air to the brake-cylinder therethrough, and brake-release mechanism communicating with said passage intermediate its length.

17. The combination of a main casing or valve-body containing separate brake-release and service mechanisms, separate diaphragms for operating said mechanisms, caps fitting on said valve-body and clamping the diaphragms in place, and a supplemental casing secured to the valve-body and containing the emergency mechanism.

18. Service mechanism comprising, in combination with a casing having ports and passages adapted to connect an auxiliary reservoir with a brake-cylinder, a diaphragm arranged in the casing and exposed on opposite sides to train-pipe and auxiliary-reservoir air, a service-valve attached to the diaphragm and working in a chamber in said casing, and a guide-ring fitting in one end of said chamber and forming a guide for the service-valve, said ring having an annular series of air-ports.

19. In a device for actuating railway-brakes, the combination of release-valve mechanism having communication with the train-pipe through a large passage, and a single and direct feed-passage from the train-pipe to the auxiliary reservoir, said last-named passage being restricted and of less carrying capacity than the other passage to cause a release of the brakes before any substantial replenishing of the auxiliary reservoir.

20. In a device for actuating railway-brakes, the combination of release-valve mechanism operated by a movable abutment which is exposed on one side to pressure through a passage of considerable carrying capacity leading from the train-pipe, and a feed-passage from the train-pipe to the auxiliary reservoir, such feed-passage being independent both physically and functionally of such mechanism and of restricted size and of less carrying capacity than the first-named passage.

21. In a device for actuating railway-brakes, the combination of release-valve mechanism operated by a movable abutment which operates in a chamber and which is exposed on one side to pressure through a passage of large carrying capacity leading from the train-pipe, a feed-passage leading from the train-pipe to the auxiliary reservoir and provided with a port of predetermined and restricted carrying capacity for restricting the feed of air as compared with the flow through the passage leading to said abutment.

22. In a device for actuating railway-brakes, the combination of release-valve mechanism operated by a movable abutment which is exposed on one side to pressure through a passage leading from the train-pipe, a feed-passage from the train-pipe to the auxiliary reservoir, and a bushing arranged in such feed-passage and provided with a port for restricting the feed as compared with the flow of pressure through the passage leading to the abutment.

23. In a device for actuating railway-brakes, the combination of release-valve mechanism having communication with the train-pipe through a passage of comparatively large carrying capacity, and a feed-passage from the train-pipe to the auxiliary reservoir, said feed-passage being independent both physically and functionally of the release-valve mechanism and of a less carrying capacity than the first-named passage whereby a release of the brakes is occasioned before any substantial replenishing of the auxiliary reservoir, and a check-valve in said feed-passage.

24. In a device for actuating railway-brakes, the combination of means operating in chambers for admitting and releasing pressure to and from the brake-cylinder, a feed-passage from the train-pipe to the auxiliary reservoir independent of said chambers, and a check-valve device therein comprising a piston-controlled valve interposed in such passage but adapted to open in the feeding operation, said piston being exposed on opposite sides to train-pipe and auxiliary-reservoir pressure respectively.

25. In a device for actuating railway-brakes, the combination of means operating in chambers for admitting and releasing pressure to and from the brake-cylinder, a single feed-passage from the train-pipe to the auxiliary reservoir for feeding pressure to such reservoir when the brakes are released, and a check-valve device therein comprising a bushing interposed in said passage and having a side port communicating therewith, and a piston-controlled valve operating in said bushing, said feed-passage leading direct from the train-pipe to the auxiliary reservoir and independent of such chambers.

26. In a device for actuating railway-brakes, the combination of means operating in chambers for admitting and releasing pressure to and from the brake-cylinder, a single feed-passage from the train-pipe to the auxiliary reservoir, for feeding pressure to such reservoir when the brakes are released, and a check-valve device therein comprising a bushing interposed in said passage and having a side port of restricted size, a check-valve normally seating in said passage and a piston working in said bushing to operate the check-valve and to govern the port in the bushing, said feed-passage being independent of said chambers.

27. In a device for actuating railway-brakes, the combination of means operating in chambers for admitting and releasing pressure to and from the brake-cylinder, a single feed-passage from the train-pipe to the auxiliary reservoir, for feeding pressure to such reservoir when the brakes are released, and a check-valve device therein comprising a bushing interposed in said passage and having a side port of restricted size, a check-valve arranged to seat in said passage and having a piston working in said bushing, and a spring normally holding the check-valve seated, said feed-passage being independent of said chambers.

28. In a device for actuating railway-brakes, the combination, with a casing having connections with the train-pipe, auxiliary reservoir and brake-cylinder, of release-valve mechanism, service-valve mechanism and emergency-valve mechanism, all of said mechanisms being physically and operatively independent of each other.

29. In a device for actuating railway-brakes, the combination, with a casing having connections with the train-pipe, auxiliary reservoir and brake-cylinder, of release-valve mechanism, service-valve mechanism and emergency-valve mechanism, all of said mechanisms being operatively independent of each other.

30. In a device for actuating railway-brakes, the combination of an emergency-valve governing a passage from the train-pipe to the brake-cylinder, a piston operatively connected with the valve, a casing having a chamber in which the piston travels and which on one side of the piston has free communication with the train-pipe and on the other side a restricted communication, said two communications entering the piston-chamber on opposite sides of the piston.

31. In a device for actuating railway-brakes, the combination of an emergency-valve governing a passage from the train-pipe to the brake-cylinder, a piston operatively connected with the valve, a casing having a chamber in which the piston travels and which on one side of the piston has free communication with the train-pipe and on the other side a restricted communication, said two communications being separate and independent of each other.

WILLIAM P. A. MACFARLANE.

Witnesses:
S. E. HIBBEN,
AMELIA WILLIAMS.